(12) United States Patent
Murosaki

(10) Patent No.: US 8,693,065 B2
(45) Date of Patent: Apr. 8, 2014

(54) CASE FOR PORTABLE IMAGE READING APPARATUS

(75) Inventor: Mikio Murosaki, Ishikawa (JP)

(73) Assignee: PFU Limited, Ishikawa (JP)

( * ) Notice: Subject to any disclaimer, the term of this patent is extended or adjusted under 35 U.S.C. 154(b) by 277 days.

(21) Appl. No.: 13/230,238

(22) Filed: Sep. 12, 2011

(65) Prior Publication Data

US 2012/0099162 A1 Apr. 26, 2012

(30) Foreign Application Priority Data

Oct. 21, 2010 (JP) ................. 2010-236814

(51) Int. Cl.
| | |
|---|---|
| H04N 1/04 | (2006.01) |
| G06K 7/10 | (2006.01) |
| E05F 1/08 | (2006.01) |
| A45F 3/00 | (2006.01) |
| H01L 27/00 | (2006.01) |
| G09G 3/20 | (2006.01) |

(52) U.S. Cl.
USPC .......... 358/474; 235/472.01; 16/286; 190/11; 250/208.1; 345/74.1

(58) Field of Classification Search
USPC ........ 358/474, 488, 497; 235/472.01; 16/286; 190/11
See application file for complete search history.

(56) References Cited

U.S. PATENT DOCUMENTS

| | | | | |
|---|---|---|---|---|
| 5,844,772 | A * | 12/1998 | Lee et al. | 361/679.26 |
| 6,454,064 | B1 * | 9/2002 | Cheng | 190/11 |
| 6,672,513 | B2 * | 1/2004 | Bard et al. | 235/472.01 |
| 2002/0011972 | A1 * | 1/2002 | Yamazaki et al. | 345/74.1 |
| 2005/0094216 | A1 * | 5/2005 | Wu | 358/474 |
| 2008/0034540 | A1 * | 2/2008 | Avery et al. | 16/286 |
| 2011/0249303 | A1 * | 10/2011 | Takabatake et al. | 358/474 |

FOREIGN PATENT DOCUMENTS

JP 3258448 B2 12/2001

* cited by examiner

Primary Examiner — Charlotte M Baker
Assistant Examiner — Rury Grisham
(74) Attorney, Agent, or Firm — McDermott Will & Emery LLP

(57) ABSTRACT

A carry case includes a body, a cover, and a lock unit. The body houses an image scanner. The cover is supported with respect to the body such that the cover can rotate around a longitudinal direction of the body. The lock unit locks the cover to the body in a closing state in which the cover covers the body after being rotated with respect to the body in an approaching direction along which the cover approaches the body. The cover is rotated with respect to the body in a withdrawing direction opposite to the approaching direction while the lock held by the lock unit is being released, so that the cover is developed to form a discharge path of a read medium.

12 Claims, 10 Drawing Sheets

CASE FOR PORTABLE IMAGE READING APPARATUS

CROSS-REFERENCE TO RELATED APPLICATIONS

The present application claims the benefit of priority from Japanese Patent Application No. 2010-236814 filed in Japan on Oct. 21, 2010, the entire contents of which are incorporated herein by reference.

BACKGROUND OF THE INVENTION

1. Field of the Invention

The present invention relates to a case for a portable image reading apparatus.

2. Description of the Related Art

Image reading apparatuses include a portable image reading apparatus that is designed to be carried everywhere by a user. The portable image reading apparatus is generally carried in a bag. When the portable image reading apparatus is carried in a bag without any protections, the portable image reading apparatus may get dirty and scratches, or be damaged. In order to prevent the portable image reading apparatus from deteriorating, a dedicated case for housing a portable image reading apparatus (hereinafter, simply referred to as a "carry case") may be used. Refer to U.S. Patent Application Publication No. 2005/0094216. The carry case is mainly used when the portable image reading apparatus is not in use for the purpose mentioned above. Furthermore, another portable image reading apparatus is disclosed that is integrated with a carry case. Refer to Japanese Patent No. 3258448.

When a portable image reading apparatus housed in a related art carry case is used, the portable image reading apparatus is taken from the carry case and placed on a desk, for example, so as to be ready to be used. Meanwhile, the carry case is put in another place for clearing. When a user uses the portable image reading apparatus in a train, a bus, or a waiting room in a station or an airport, for example, an available area for the portable image reading apparatus is limited and the user needs to use the portable image reading apparatus on an existing small desk or on the user's laps, for example. In such a situation, it may be difficult to take out the portable image reading apparatus from the carry case or put the case in another palace for clearing. Furthermore, such handling may seem troublesome for the user. In some portable image reading apparatuses, trays are not provided that would be used for conveying read media from which images are read. Particularly, discharge trays are not provided in some cases on which the read media ejected from the portable image reading apparatuses after being read would be placed. With such portable image reading apparatuses, a read medium conveyed from the portable image reading apparatus is ejected in the place where the portable image reading apparatus is placed. Depending on the conditions of the place in which the read medium is ejected, the read medium may not be stably ejected. For example, if obstacles are present in the place where the read medium is ejected, or an area where the read medium is ejected has a shape that is likely to catch the read medium, the read medium is not stably ejected. In such cases, images read by the portable image reading apparatus may be distorted or the read media may be damaged.

There is a need for a case for a portable image reading apparatus that can achieve at least one of a stable use and an easy use of the portable image reading apparatus, regardless of the conditions of a place where the portable image reading apparatus is used.

SUMMARY OF THE INVENTION

It is an object of the present invention to at least partially solve the problems in the conventional technology.

According to one aspect of the invention, the invention is directed to a case for a portable image reading apparatus. The case includes a body for housing the portable image reading apparatus that, while conveying a read medium as an image reading object, reads the image from the read medium; a cover supported with respect to the body to be rotatable around a longitudinal direction of the body; and a lock unit for locking the cover with respect to the body in a closing state in which the cover covers the body when the cover is rotated with respect to the body in an approaching direction in which the cover approaches the body. When the cover is rotated with respect to the body in a withdrawing direction opposite to the approaching direction, with the lock by the lock unit released, the cover is developed to form a discharge path of the read medium.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The present invention is described below in detail with reference to the accompanying drawings. The present invention, however, is not limited to the following embodiments. The elements of the following embodiments include elements that those skilled in the art can easily assume or that are substantially the same as the elements known by those in the art. In the following embodiments, an image scanner that a user can carry with him is described as an example of a portable image reading apparatus. The present invention, however, is not limited to the image scanner. The present invention can be applied to any portable apparatus that scans a read medium as an image reading object with an image sensor, such as a copying machine, a facsimile, and a character recognition apparatus, and a user can carry with him.

First Embodiment

Figure 1:
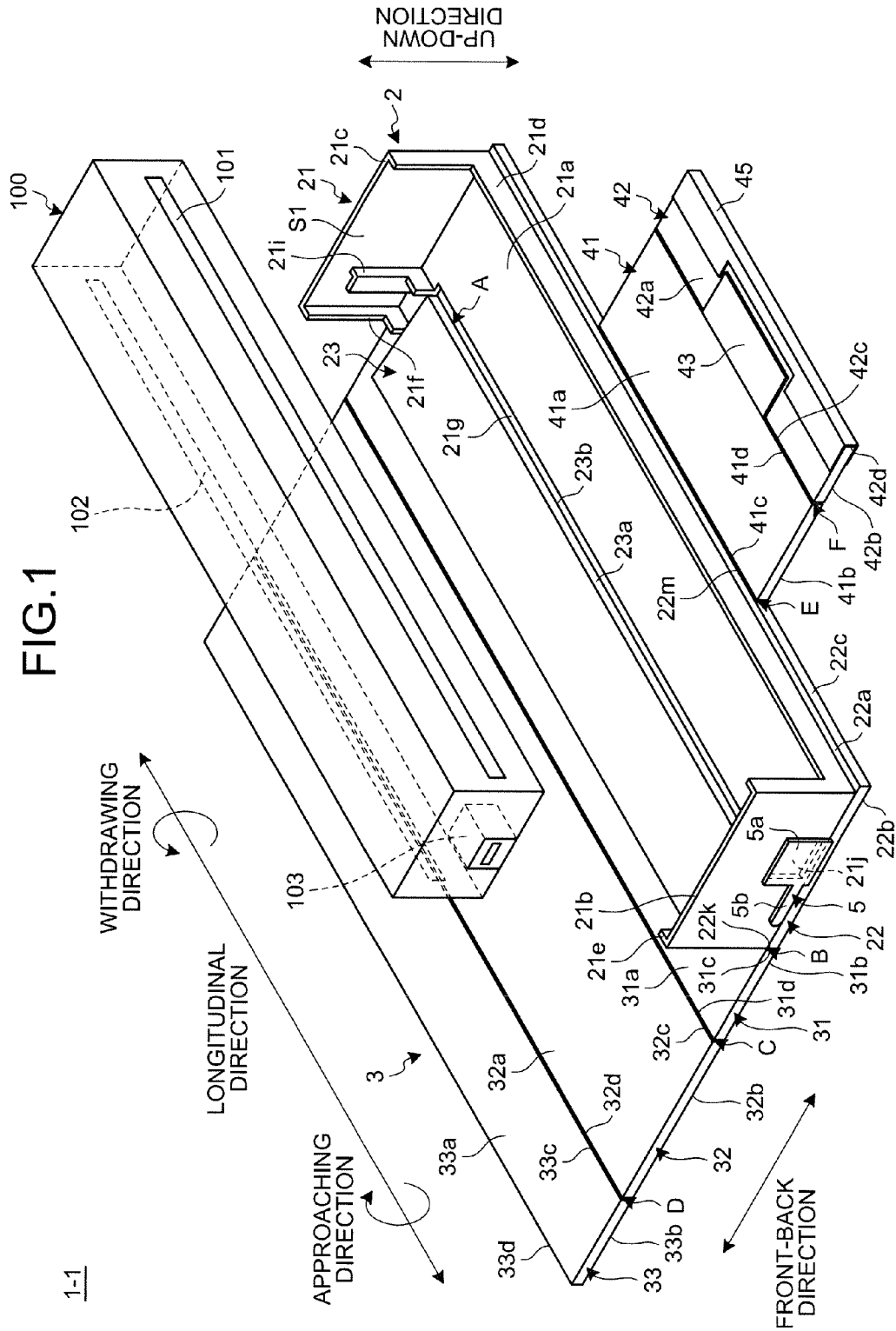
FIG. 1 is an external view of a case for a portable image reading apparatus according to a first embodiment.
Figure 2:
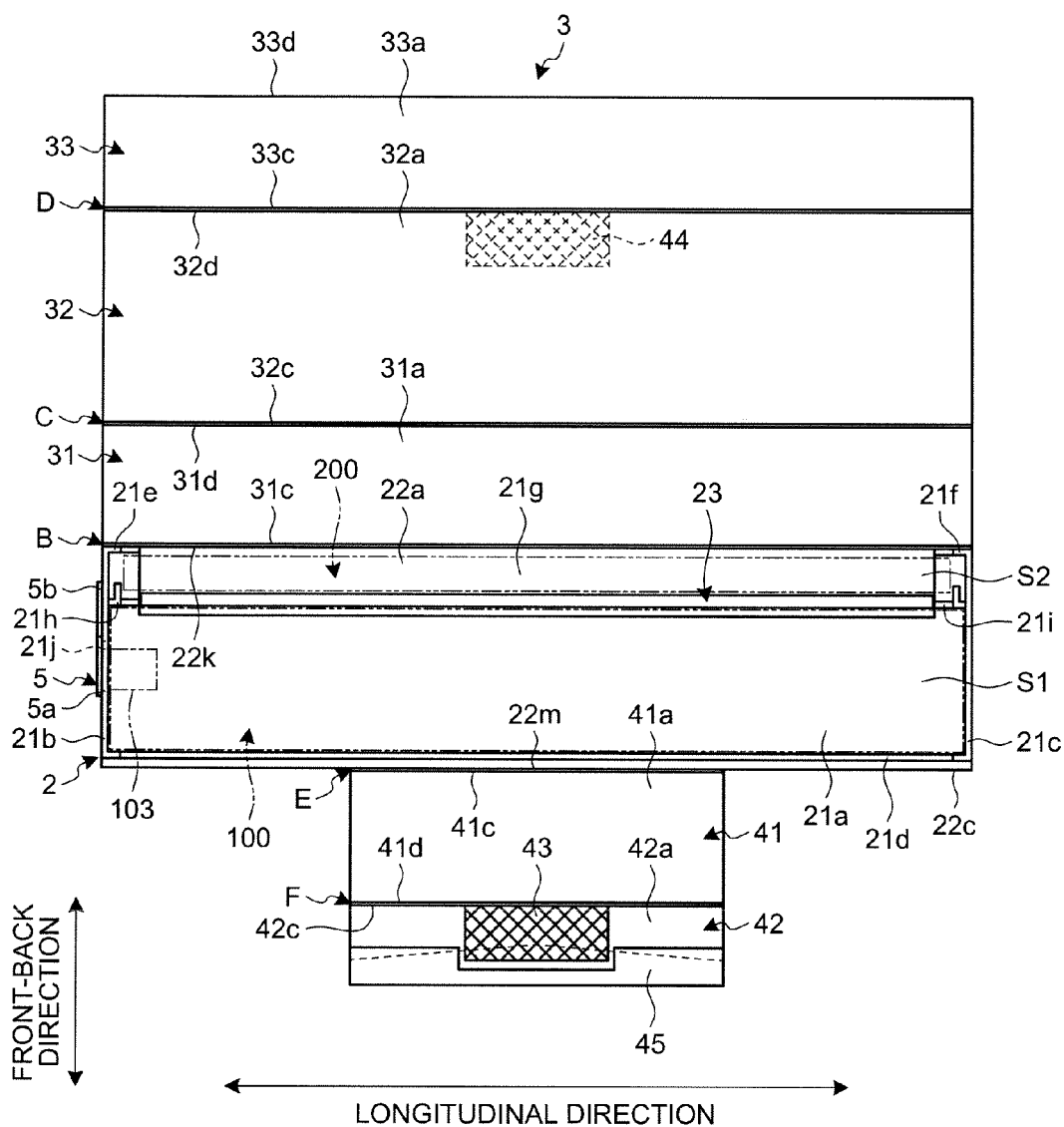
FIG. 2 is a plan view of the case for a portable image reading apparatus according to the first embodiment.
Figure 3:
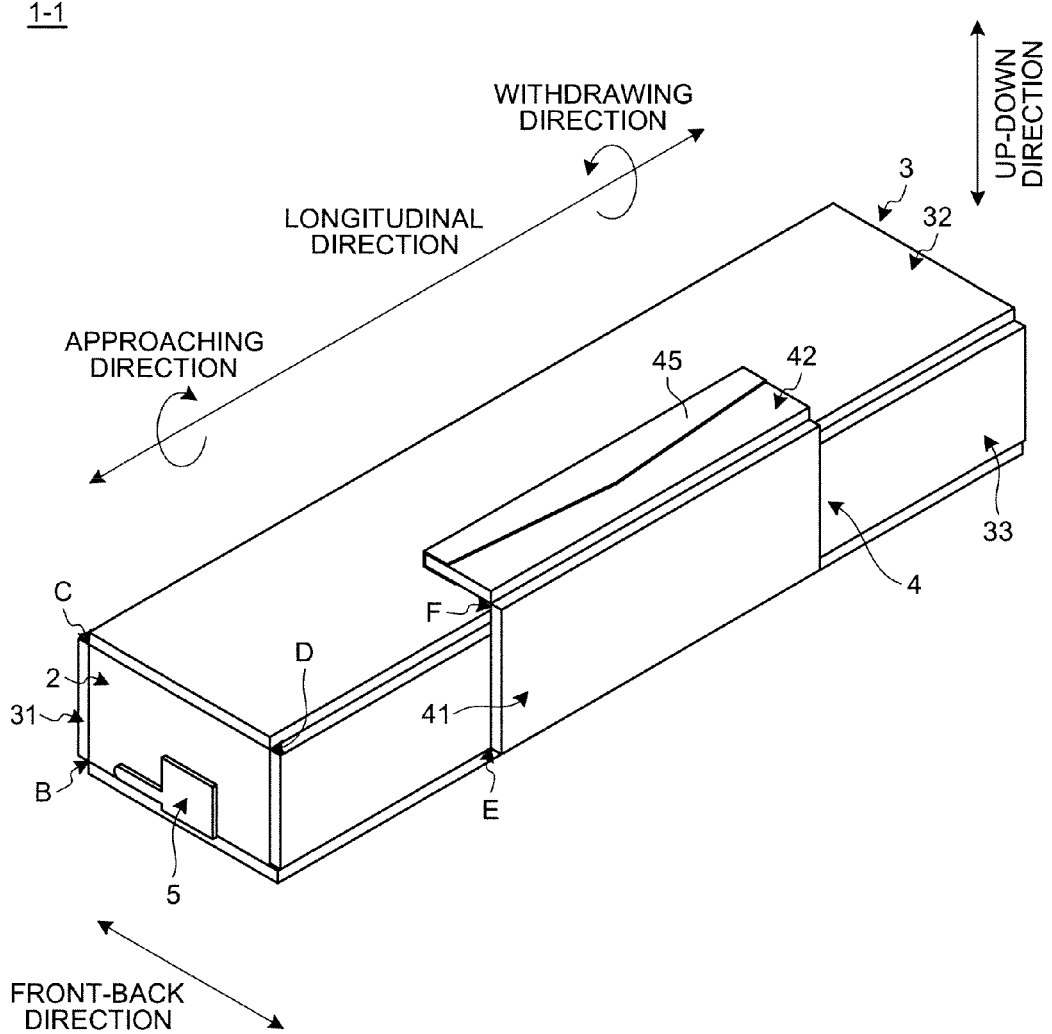
FIG. 3 is a schematic illustrating a state in which a portable image reading apparatus is housed in the case.
Figure 4:
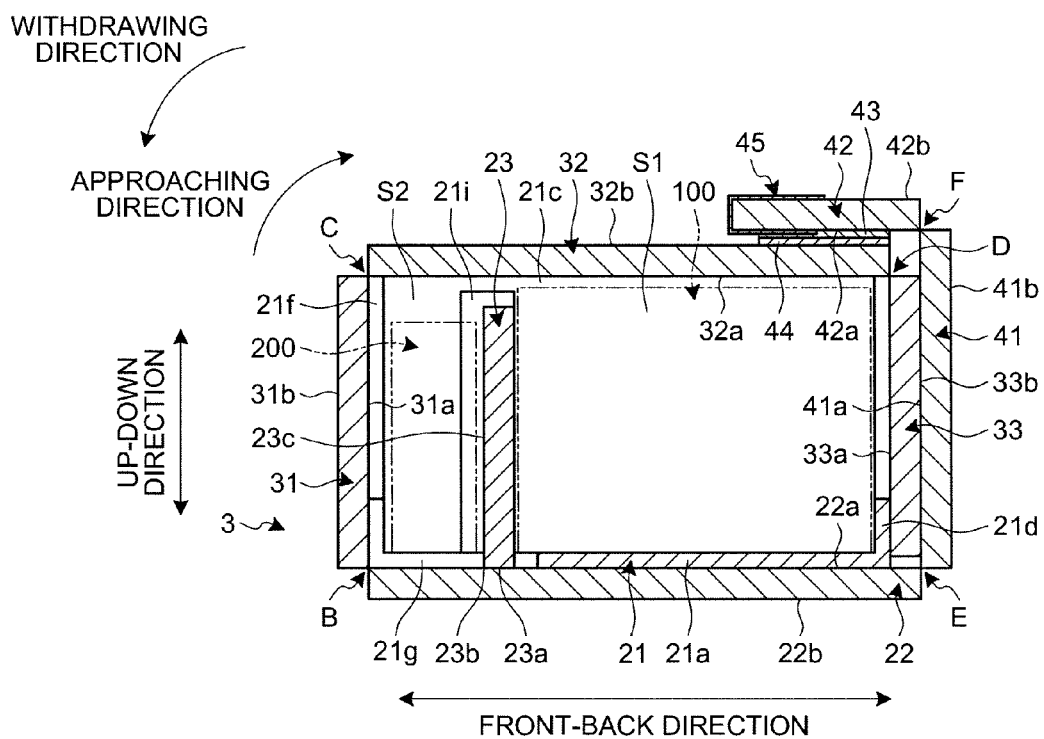
FIG. 4 is a cross-sectional view of the case for a portable image reading apparatus.

FIG. 1 is an external view of a case for a portable image reading apparatus according to a first embodiment. FIG. 2 is a plan view of the case for a portable image reading apparatus according to the first embodiment. FIG. 3 is a schematic illustrating a state in which a portable image reading apparatus is housed in the case. FIG. 4 is a cross-sectional view of the case for a portable image reading apparatus. FIG. 4 is the cross-sectional view in a plane orthogonal to a sub-scanning direction of the case for a portable image reading apparatus in which the portable image reading apparatus is housed.

As illustrated in FIG. 1, a case 1-1 for a portable image reading apparatus (hereinafter simply referred to as a "carry case") houses an image scanner 100. In the image scanner 100, a medium to be read (also simply referred to as a read medium) is inserted manually by a user from an insertion port 101, and conveyed by a conveying unit (not illustrated) to an imaging unit having an image sensor (not illustrated). The image scanner 100 reads the read medium that is being conveyed by the imaging unit to produce read image data of the read medium, and discharges the read medium after being read from an outlet 102 by the conveying unit. A connector 103 is used for electrically connecting the image scanner 100 to external equipment such as a personal computer and a mobile terminal. The connector 103 is electrically connected to a connector of external equipment with a connecting cable such as an interface cable. This electrical connection allows the image scanner 100 to output produced read image data to an external terminal, to receive electric power to operate the image scanner 100, and to change operation setting for reading a read medium by input from an external terminal.

As illustrated in FIGS. 1 to 4, the carry case 1-1 includes a body 2, a cover 3, and a lock unit 4.

The body 2 houses the image scanner 100. The body 2 includes a housing member 21, a bottom member 22, and a partition 23. The housing member 21 is made of a synthetic resin such as an acrylonitride-butadiene-styrene (ABS) resin, for example. The housing member 21 includes a bottom surface member 21a, side surface members 21b and 21c, a front rib 21d, and rear ribs 21e and 21f.

The bottom surface member 21a, on which the image scanner 100 is placed when the image scanner 100 is housed in the body 2, is formed in a rectangular shape. The side surface members 21b and 21c are formed at both edges of the bottom surface member 21a in a longitudinal direction of the body 2, i.e., in a width direction of the carry case 1-1. The bottom surface member 21a is formed such that the length between the side surface members 21b and 21c in the longitudinal direction, i.e., the length of a first housing unit S1 in the longitudinal direction, is equal or nearly equal to the width of the image scanner 100. Therefore, the side surface members 21b and 21c function as a limiting mechanism that limits a state of the image scanner 100 housed in the body 2, i.e., movement of the image scanner 100 in the housed state in the longitudinal direction relative to the body 2. This mechanism can limit the movement of the image scanner 100 relative to the carry case 1-1 (movement in the longitudinal direction) when the image scanner 100 in the housed state reads a read medium, so that the image scanner 100 can more stably read a read medium while being housed. The bottom surface member 21a has a notch 21g. The bottom surface member 21a has both edges in a front-back direction. The notch 21g is formed from an edge on a back side toward a front side. The front-back direction is orthogonal to the longitudinal direction and an up-down direction of the body 2. The direction toward the front rib 21d side is defined as the front side, while the direction toward the rear ribs 21e and 21f sides is defined as the back side. The notch 21g is formed in an area surrounded by the rear ribs 21e and 21f, and the ribs 21h and 21i (which are described later).

The side surface members 21b and 21c are formed such that the distance in the up-down direction from the bottom surface member 21a, i.e., the distance of the first housing unit S1, which is described later, in the up-down direction is larger than the height of the image scanner 100. The up-down direction is orthogonal to the longitudinal direction and the front-back direction of the body 2. The direction toward the bottom surface member 21a side is defined as the down direction, while the direction toward a side opposite the bottom surface member 21a side is defined as the up side. The side surface member 21b has the rib 21h on an inner wall surface thereof, while the side surface member 21c has the rib 21i on an inner wall surface thereof. The ribs 21h and 21i protrude from the respective inner wall surfaces opposite to each other in the longitudinal direction so as to face each other. The ribs 21h and 21i are formed such that distances between the front rib 21d and the ribs 21h and 21i in the front-back direction, i.e., the length of the first housing unit S1 in the front-back direction, is equal or nearly equal to the length orthogonal to the depth of the image scanner 100. Therefore, the side surface members 21b and 21c, and the front rib 21d function as a limiting mechanism that limits the movement of the image scanner 100 in the housed state in the front-back direction relative to the body 2. When the image scanner 100 in the housed state reads a read medium, this mechanism can limit the movement of the image scanner 100 relative to the carry case 1-1 (movement in the front-back direction). Accordingly, the image scanner 100 in a housed state can more stably read a read medium.

The side surface member 21b has a connecting hole 21j at a location facing the connector 103 of the image scanner 100 in the housed state. The connecting hole 21j penetrates the side surface member 21b in the longitudinal direction. The connecting hole 21j is formed in such a shape that a connecting cable to be connected to the connector 103 of the image scanner 100 can be inserted, for example. Therefore, a connecting cable can be connected to the connector 103 of the image scanner 100 while the image scanner 100 is being housed in the body 2. Because of this, the image scanner 100 can be electrically connected to external equipment without being removed from the body 2, and then can read a read medium, produce read image data, and output the data to external equipment. Furthermore, read image data stored in a storage unit included in the image scanner 100 can be output to external equipment while the image scanner 100 is being housed in the body 2. The connecting hole 21j is not limited to be formed on the side surface member 21b, but can be formed at any location on the body 2 because the connecting hole 21j is formed corresponding to the location of the connector 103 of the image scanner 100 in the housed state. When the carry case 1-1 is used for the image scanners 100 of different types having the connectors 103 at different locations, a plurality of connecting holes 21j may be formed corresponding to the respective locations of the connectors 103 of the image scanners 100.

The connecting hole 21*j* is plugged by inserting a cap 5 into the connecting hole 21*j*. The cap 5 is made by material having elasticity such as a synthetic resin or rubber, for example. The cap 5 is composed of a plug 5*a* and a support 5*b*. The plug 5*a*, inserted into the connecting hole 21*j*, plugs the connecting hole 21*j*. The plug 5*a* is formed so as to be attachable to and detachable from the connecting hole 21*j*. When the image scanner 100 in the housed state is not electrically connected to external equipment, the connector 103 can be prevented from being exposed out of the carry case 1-1 by plugging the connecting hole 21*j* with the cap 5. As a result, entry of dust and dirt from an outside into an inside of the body 2 and deposition of dust and dirt on the connector 103 can be prevented. The support 5*b* is supported by the body 2 and is formed so as to protrude backward from the edge on the back side of the plug 5*a*. The support 5*b* is inserted into a supporting hole (not illustrated) of the side surface member 21*b* so as to be supported by the body 2. Therefore, the support 5*b* can prevent the cap 5, removed from the connecting hole 21*j*, from being separated from the body 2. As a result, the cap 5 can be prevented from being lost.

The front rib 21*d*, U-shaped when viewed from the front side, is formed at the edge on the front side of the bottom surface member 21*a*. Both edges in the longitudinal direction of the front rib 21*d* are integrally formed with the side surface members 21*b* and 21*c*, respectively. The front rib 21*d*, when viewed from the front side, is formed so as not to overlap with the insertion port 101 of the image scanner 100 in the housed state. Accordingly, while the image scanner 100 is being housed in the body 2, this structure can prevent the front rib 21*d* from hindering a user who is manually inserts a read medium into the insertion port 101.

The rear ribs 21*e* and 21*f* are integrally formed with the side surface members 21*b* and 21*c*, respectively, at the edge on the back side and also at both ends in the longitudinal direction of the bottom surface member 21*a*. The rear ribs 21*e* and 21*f*, when viewed from the back side, are formed so as not to overlap with the outlet 102 of the image scanner 100 in the housed state. Accordingly, while the image scanner 100 is being housed in the body 2, the rear ribs 21*e* and 21*f* can be prevented from coming into contact with a read medium ejected from the outlet 102 by the conveying unit. As a result, this arrangement can prevent the rear ribs 21*e* and 21*f* from hindering a read medium ejected by the conveying unit.

The bottom surface member 21*a* of the housing member 21 is fixed on the bottom member 22. The bottom member 22 is provided with the partition 23. The bottom member 22 is formed in a rectangular shape with the following structure, for example. A core such as a paper board is layered on a resin sheet such as a polyvinyl chloride (PVC) sheet. Then, part at which the core is exposed is covered with a top sheet such as cloth to form the structure in which the core is sandwiched between the top sheet and the resin sheet. In the embodiment, with regard to the bottom member 22*a*, a back surface 22*a* thereof, which is fixed to the housing member 21, is formed from a PVC sheet. A front surface 22*b* opposite the back surface 22*a* of the bottom member 22 is formed from cloth. The bottom member 22 is formed longer than the housing member 21 in the front-back direction. When fixed to the housing member 21, the bottom member 22 forms a protrusion 22*c* protruding forward from the housing member 21.

The partition 23, for example, is formed in a rectangular shape, with a core such as a paper board covered by a resin sheet such as a PVC sheet. The partition 23 is formed shorter than the notch 21*g* in the longitudinal direction. The partition 23 is disposed at the notch 21*g* and is supported rotatably around the longitudinal direction with respect to the bottom member 22 at a rotation reference A. In the embodiment, when the partition 23 stands in the up-down direction, i.e., is in a standing state (refer to FIG. 4), the rotation reference A is set between an edge 23*b* on the back side and the back surface 22*a* facing the edge 23*b*. The edge 23*c* is the edge on the back side out of both edges in the front-back direction of a bottom surface 23*a* facing the bottom member 22. That is, the partition 23 is supported rotatably around the longitudinal direction with respect to the body 2. Specifically, while the partition 23 is being stood, a rear surface 23*c* on the back side of the partition 23 and the back surface 22*a* of the bottom member 22 are linked with a transformable sheet (e.g., a resin sheet), or the rear surface 23*c* and the back surface 22*a* are formed in a single resin sheet, so that the partition 23 is supported rotatably around the longitudinal direction with respect to the bottom member 22. The partition 23 is formed so as not to protrude above the side surface members 21*b* and 21*c* when the partition 23 is in the standing state. When the partition 23 is stood, the body 2 is partitioned into two spaces. One space is formed between the partition 23 and the front rib 21*d*: the first housing unit S1 housing the image scanner 100. The other space is formed between the partition 23 and the rear ribs 21*e* and 21*f*: a second housing unit S2. Providing the partition 23 allows the body 2 to house the image scanner 100 in the first housing unit S1 and to house in the second housing unit S2 peripherals of the image scanner 100 such as the connecting cable described above. Consequently, when the image scanner 100 is housed in the carry case 1-1 and is carried around, a case can be prevented in which peripherals that are not housed in the carry case 1-1 are put in a bag as separate luggage, because peripherals, such as the connecting cable, of the image scanner 100 can be housed in the carry case 1-1 as described above.

The cover 3 covers the body 2 to cover the image scanner 100 housed in the body 2. The cover 3 is composed of a plurality of panel members: panel members 31, 32, and 33. The panel members 31, 32, and 33 are formed such that their lengths are equal or nearly equal to that of the body 2 in the longitudinal direction. The panel members 31, 32, and 33 are formed in the same manner as the bottom member 22. For example, each of the panel members 31, 32, and 33 is formed in a rectangular shape with the following structure. A core such as a paper board is layered on a resin sheet such as a PVC sheet. Then, part at which the core is exposed is covered with a top sheet such as cloth to form the structure in which the core is sandwiched between the top sheet and the resin sheet. In the embodiment, back surfaces 31*a*, 32*a*, and 33*a* of the panel members 31, 32, and 33 facing the body 2 are formed from a PVC sheet, and on the opposite side, front surfaces 31*b*, 32*b*, and 33*b* are formed from cloth.

The panel member 31 faces the rear ribs 21*e* and 21*f* of the body 2 when the cover 3 covers the body 2, i.e., in a closed state. The panel member 31 is supported rotatably around the longitudinal direction with respect to the bottom member 22 at a rotation reference B. In the embodiment, the rotation reference B is set between an edge 31*c* and an edge 22*k*. The edge 31*c* is the edge on the bottom member 22 side out of both edges in a sideways direction of the back surface 31*a* of the panel member 31. The edge 22*k* is the edge on the back side of the back surface 22*a* facing the edge 31*c*. That is, the panel member 31 is supported rotatably around the longitudinal direction with respect to the body 2. The sideways direction is orthogonal to the longitudinal direction and the thickness direction of each of the panel members 31, 32, and 33 (the front-back direction in FIG. 1).

The panel member 32, in the closed state, faces the edges on the up side of the side surface members 21*b* and 21*c* of the body 2. The panel member 32 is supported rotatably around the longitudinal direction with respect to the panel member 31 at a rotation reference C. In the embodiment, the rotation reference C is set between an edge 32c and an edge 31d. The edge 32c is the edge on the panel member 31 side out of both edges in the sideways direction of the back surface 32a of the panel member 32. The edge 31d is the edge on the panel member 32 side out of both edges in the sideways direction of the back surface 31a facing the edge 32c. That is, the panel member 32 is supported rotatably around the longitudinal direction with respect to the body 2 with the panel member 31 interposed therebetween.

The panel member 33, in the closed state, faces the front rib 21d of the body 2. The panel member 33 is supported rotatably around the longitudinal direction with respect to the panel member 32 at a rotation reference D. In the embodiment, the rotation reference D is set between an edge 33c and an edge 32d. The edge 33c is the edge on the panel member 32 side out of both edges in the sideways direction of the back surface 33a of the panel member 33. The edge 32d is the edge on the panel member 33 side out of both edges in the sideways direction of the back surface 32a which faces the edge 33c. That is, the panel member 33 is supported rotatably around the longitudinal direction with respect to the body 2 with the panel members 31 and 32 interposed therebetween. In this way, since the panel members 31, 32, and 33 are supported such that they can rotate around the longitudinal direction at the respective rotation references B, C, and D, the cover 3 is supported rotatably around the longitudinal direction with respect to the body 2.

The lock unit 4 locks the cover 3 to the body 2. The lock unit 4 includes a plurality of panel members 41 and 42, a first lock member 43, a second lock member 44, and a weight 45. The panel members 41 and 42 are formed such that their lengths in the longitudinal direction are nearly one half to one third of that of the body 2. The panel members 41 and 42 are formed in the same manner as the bottom member 22. For example, each of the panel members 41 and 42 is formed in a rectangular shape with the following structure. A core such as a paper board is layered on a resin sheet such as a PVC sheet. Then, part at which the core is exposed is covered with a top sheet such as cloth to form the structure in which the core is sandwiched between the top sheet and the resin sheet. In the embodiment, back surfaces 41a and 42a of the panel members 41 and 42 facing the body 2 are formed from a PVC sheet, and on the opposite side, front surfaces 41b and 42b are formed from cloth.

The panel member 41, after the closed state, faces the front rib 21d of the body 2 with the panel member 33 interposed therebetween, when locking the cover 3 to the body 2, i.e., in a locking state. The panel member 41 is supported rotatably around the longitudinal direction with respect to the bottom member 22 at a rotation reference E. In the embodiment, the rotation reference E is set between an edge 41c and an edge 22m. The edge 41c is the edge on the bottom member 22 side out of both edges in a sideways direction of the back surface 41a of the panel member 41. The edge 22m is the edge on the back side of the back surface 22a which faces the edge 41c. That is, the panel member 41 is supported rotatably around the longitudinal direction with respect to the body 2. The sideways direction is orthogonal to the longitudinal direction and the thickness direction of each of the panel members 41 and 42 (the front-back direction in FIG. 1).

The panel member 42, in the locking state, faces the edges on the up side of the side surface members 21b and 21c of the body 2 with the panel member 32 interposed therebetween. The panel member 42 is supported rotatably around the longitudinal direction with respect to the panel member 41 at a rotation reference F. In the embodiment, the rotation reference F is between an edge 42c and an edge 41d. The edge 42c is the edge on the panel member 41 side out of both edges in the sideways direction of the back surface 42a of the panel member 42. The edge 41d is the edge on the panel member 42 out of both edges in the sideways direction of the back surface 41a which faces the edge 42c. That is, the panel member 42 is supported rotatably around the longitudinal direction with respect to the body 2 with the panel member 41 interposed therebetween. In this way, since the panel members 41 and 42 are supported such that they can rotate around the longitudinal direction at the respective rotation references E and F, the lock unit 4 is supported rotatably around the longitudinal direction with respect to the body 2.

The first lock member 43 and the second lock member 44 are used to lock the cover 3 to the body 2. In the embodiment, the first lock member 43 and the second lock member 44 form a hook-and-loop fastener. The structure formed by the first lock member 43 and the second lock member 44 is not limited to the hook-and-loop fastener. A combination of a magnet and a magnetic body, or a combination of a hook-shaped member and a member receiving the hook-shaped member may be acceptable, for example. The first lock member 43 is disposed on the back surface 42a of the panel member 42. The second lock member 44, in the locking state, is disposed on the front surface 32b of the panel member 32 at a location at which the second lock member 44 faces the first lock member 43.

The weight 45 is attached on the panel member 42 so as to cover an edge 42d on a side opposite to the panel member 41 side out of both edges in the sideways direction of the panel member 42, and so as to cover a part of the back surface 42a and the front surface 42b.

How the image scanner 100 is housed in the carry case 1-1 according to the first embodiment is described below. First, the image scanner 100 is housed in the body 2. Herein, a user places the image scanner 100 into the first housing unit S1 of the body 2. The image scanner 100 in the housed state is conveyed backward, and a read medium is also ejected backward. When a peripheral 200 is housed in the body 2 together with the image scanner 100, a user sets the partition 23 in the standing state and thereafter places the peripheral 200 in the second housing unit S2. In this way, the image scanner 100 and the peripheral 200 are housed in the body 2.

Then, while the image scanner 100 and the peripheral 200 are housed in the body 2, the cover 3 is rotated in an approaching direction in which the cover 3 approaches the body 2. The cover 3 covers the body 2 to be set in the closed state. Specifically, the user rotates the panel member 31 of the cover 3 at the rotation reference B in the approaching direction with respect to the bottom member 22, so that the panel member 31 faces the rear ribs 21e and 21f of the body 2. Then, the user rotates the panel member 32 at the rotation reference C in the approaching direction with respect to the panel member 31 facing the rear ribs 21e and 21f of the body 2. As a result, the panel member 32 faces the edges on the up side of the side surface members 21b and 21c of the body 2. Then, the user rotates the panel member 33 at the rotation reference D in the approaching direction with respect to the panel member 32 facing the edges on the up side of the side surface members 21b and 21c of the body 2. Consequently, the panel member 33 faces the front rib 21d of the body 2. After the rotation, an edge 33d faces the protrusion 22c of the bottom member 22 in the up-down direction. The edge 33d is the edge on the side opposite to the panel member 32 side out of both edges in the sideways direction of the back surface 33a.

Thereafter, while the cover 3 is in the closed state, the cover 3 is locked to the body 2 by the lock unit 4. Specifically, the user rotates the panel member 41 of the lock unit 4 at the rotation reference E in the approaching direction with respect to the bottom member 22, so that the panel member 41 faces the panel member 33 in the closed state. Then, the user rotates the panel member 42 at the rotation reference F in the approaching direction with respect to the panel member 41 facing the panel member 33 in the closed state. As a result, the panel member 42 faces the panel member 32. Then, the user brings the first lock member 43 into contact with the second lock member 44 to lock the cover 3 to the body 2. Accordingly, the image scanner 100 and the peripheral 200 are housed in the carry case 1-1.

A case is described below in which the image scanner 100 housed in the carry case 1-1 is used, according to the first embodiment. First, a user places the carry case 1-1 housing the image scanner 100 and the peripheral 200 at a place where the image scanner 100 and the peripheral 200 are used. Then, the lock held by the lock unit 4 is released. Specifically, the user releases the contact between the first lock member 43 and the second lock member 44. Then, the user rotates the panel member 42 with respect to the panel member 41 at the rotation reference F in a withdrawing direction opposite to the approaching direction, and rotates the panel member 41 at the rotation reference E in the withdrawing direction with respect to the bottom members 22, so that the panel members 41 and 42 are developed to be in a developed state. The weight 45 attached on the panel member 42 can prevent the panel members 41 and 42 in the developed state from being rotated again in the approaching direction. Accordingly, the panel members 41 and 42, when viewed from the front side, can be prevented from overlapping with the insertion port 101 of the image scanner 100 in the housed state. While the image scanner 100 is being housed in the body 2, when a user manually inserts a read medium into the insertion port 101, this developed state can prevent the panel members 41 and 42 from hindering the insertion.

Then, while the lock held by the lock unit 4 is released, the user rotates the cover 3 in the withdrawing direction from the body 2, so that the cover 3 is developed. Specifically, the user rotates the panel member 33 at the rotation reference D in the withdrawing direction with respect to the panel member 32, and then rotates the panel member 32 at the rotation reference C in the withdrawing direction with respect to the panel member 31, and further rotates the panel member 31 at the rotation reference B in the withdrawing direction with respect to the bottom member 22. Consequently, the cover 3 is developed.

The user takes out the peripheral 200 from the body 2 and sets the partition 23 to a slanted state from the standing state. Specifically, the user rotates the partition 23 in the standing state at the rotation reference A in the withdrawing direction with respect to the bottom member 22, by which the partition 23 is in the slanted state. As a result, the partition 23 can be prevented from coming into contact with a read medium ejected from the outlet 102, and the read medium can be stably ejected.

The image scanner 100 in the housed state reads a read medium. Specifically, the user inserts a connecting cable included in the peripheral 200 into the connecting hole 21j from which the cap 5 has been removed, and electrically connects the connecting cable to the connector 103 of the image scanner 100. The user electrically connects the connecting cable to external equipment to supply electric power to the image scanner 100. Then, the user sets the image scanner 100 to a readable state, and thereafter manually inserts a read medium into the insertion port 101, so that the image scanner 100 starts reading the read medium. The read medium after being read out is ejected from the outlet 102. In the ejection, since the ejection takes place backward, the read medium ejected is further ejected along the cover 3 in the developed state. In other words, in the embodiment, the cover 3 forms a discharge path for discharging a read medium.

As described above, the carry case 1-1 according to the embodiment, which houses the image scanner 100 in the body 2, allows the image scanner 100 to read a read medium. Accordingly, procedures taking out the image scanner 100 from the carry case 1-1, and clearing the carry case 1-1 after the image scanner 100 is taken out are saved. As a result, the image scanner 100 can be easily used. Furthermore, since the cover 3 in the developed state forms a discharge path by covering a place where the image scanner 100 is used, a read medium ejected from the image scanner 100 is always ejected along the cover 3 in the developed state regardless of the place where the image scanner 100 is used. The cover 3 in the developed state allows a read medium to be stably ejected without any influence on the place where the image scanner 100 is used. As a result, the image scanner 100 can be stably used.

Modification Example 1

In the first embodiment, a partition rotation mechanism that applies a force rotating the partition 23 in the withdrawing direction with respect to the body 2 may be included. In the embodiment, the partition rotating mechanism rotates the partition 23 at the rotation reference A in the withdrawing direction with respect to the bottom member 22. In the first embodiment, a cover rotation mechanism that applies a force rotating the cover 3 in the withdrawing direction with respect to the body 2 may be included. In the embodiment, the cover rotation mechanism includes the following three panel member rotation mechanisms: a panel member rotation mechanism that rotates the panel member 31 at the rotation reference B in the withdrawing direction with respect to the bottom member 22; a panel member rotation mechanism that rotates the panel member 32 at the rotation reference C in the withdrawing direction with respect to the panel member 31; and a panel member rotation mechanism that rotates the panel member 33 at the rotation reference D in the withdrawing direction with respect to the panel member 32. In the first embodiment, a panel member rotation mechanism that applies a force rotating the panel members 41 and 42 in the withdrawing direction with respect to the body 2 may be included. In the embodiment, the panel member rotation mechanism includes the following two panel member rotation mechanisms: a panel member rotation mechanism that rotates the panel member 41 at the rotation reference E in the withdrawing direction with respect to the bottom member 22; and a panel member rotation mechanism that rotates the panel member 42 at the rotation reference F in the withdrawing direction with respect to the panel member 41. Any mechanism can be used for the partition rotation mechanism and the panel member rotation mechanism as long as the mechanism applies a force rotating one member at a rotation reference in the withdrawing direction with respect to the other member. For example, an elastic body, such as a plate spring, a coil spring, and a synthetic resin member having elasticity, may be provided between one member and the other member. Alternatively, one member and the other member may be integrally formed in a single member having elasticity.

Modification Example 2

Figure 5:
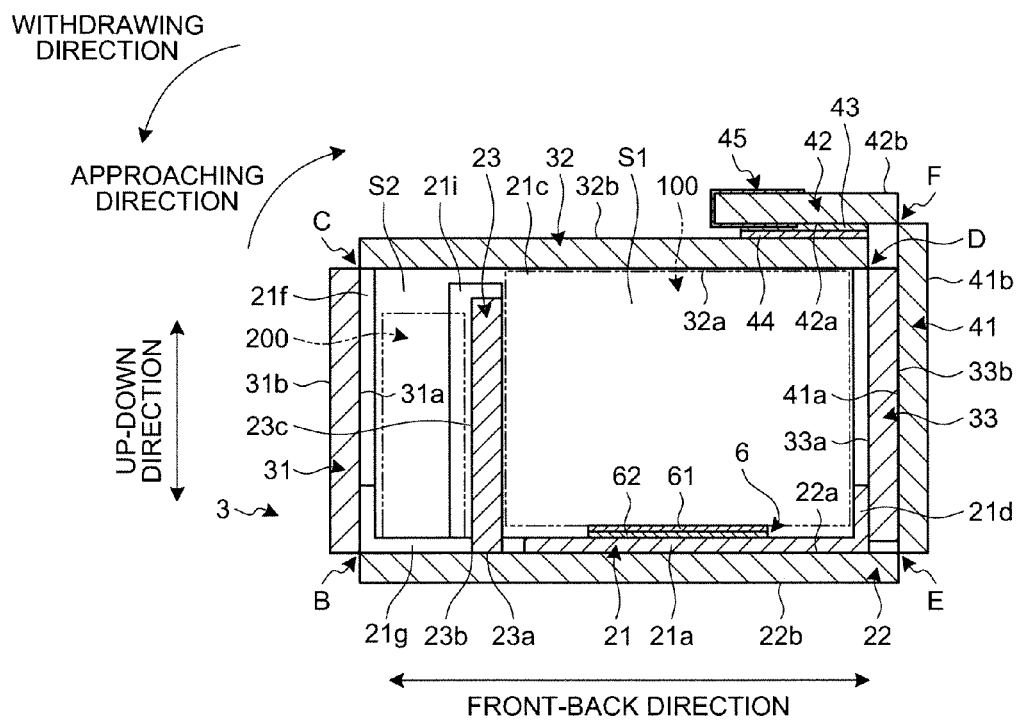
FIG. 5 is a schematic illustrating an example of an overall structure of a carry case according to a modification example 2.

In the first embodiment, the image scanner 100 is housed in the body 2 by simply being placed on the bottom surface member 21a. The present invention, however, is not limited to the embodiment. FIG. 5 is a schematic illustrating an example of an overall structure of a carry case according to a modification example 2. In the modification example, as illustrated in FIG. 5, a limiting mechanism 6 may be provided between the image scanner 100 and the bottom surface member 21a. The limiting mechanism 6 is composed of a first lock member 61 and a second lock member 62. The first lock member 61 is disposed on the bottom surface of the image scanner 100 in the housed state, while the second lock member 62 is disposed on the bottom surface member 21a. In the modification example, the first lock member 61 and the second lock member 62 form a hook-and-loop fastener. Accordingly, when the first lock member 61 and the second lock member 62 come into contact with each other, the image scanner 100 in the housed state can be limited to moving relative to the body 2 in the longitudinal direction, the up-down direction, and the front-back direction. This limiting mechanism prevents the image scanner 100 from being separated from the body 2 even if the carry case 1-1 is dropped with the cover 3 developed. Accordingly, damage to the image scanner 100 can be reduced. The structure formed by the first lock member 61 and the second lock member 62 is not limited to the hook-and-loop fastener. For example, a combination of a magnet and a magnetic body, or a combination of a hook-shaped member and a member receiving the hook-shaped member may be applicable.

Modification Example 3

Figure 6:
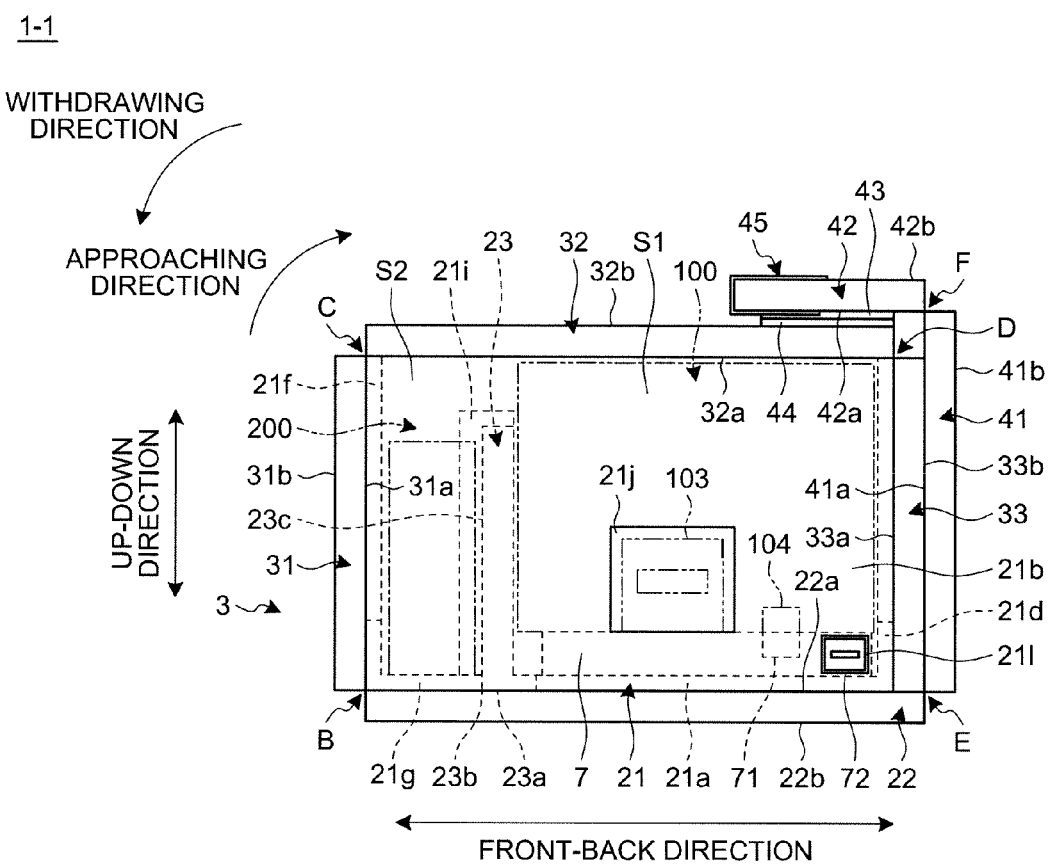
FIG. 6 is a schematic illustrating an example of an overall structure of a carry case according to a modification example 3.

In the first embodiment, electric power may be applied to the image scanner 100 in the housed state from the body 2. FIG. 6 is a schematic illustrating an example of an overall structure of a carry case according to a modification example 3. In the modification example, as illustrated in FIG. 6, a battery 7 is fixed on the bottom surface member 21a. When the image scanner 100 is housed in the first housing unit S1, a power source connector 104 of the image scanner 100 is electrically connected to a power supplying connector 71 of the battery 7, so that the battery 7 supplies electric power to the image scanner 100. Accordingly, even if the image scanner 100 and external equipment cannot be connected with a connecting cable, the image scanner 100 can be operated. The side surface member 21b of the body 2 has a charging hole 21l at a location opposite a charging connector 72 of the battery 7. The charging hole 21l penetrates the side surface member 21b in the longitudinal direction. The charging hole 21l is formed in such a shape that a charging cable to be connected to the charging connector 72 of the battery 7 can be inserted. Therefore, while the image scanner 100 is being housed in the body 2, a charging cable can be connected to the charging connector 72. In the same manner as the cap 5, a cap that can be insertable in and detachable from the charging hole may be provided.

Modification Example 4

Figure 7:
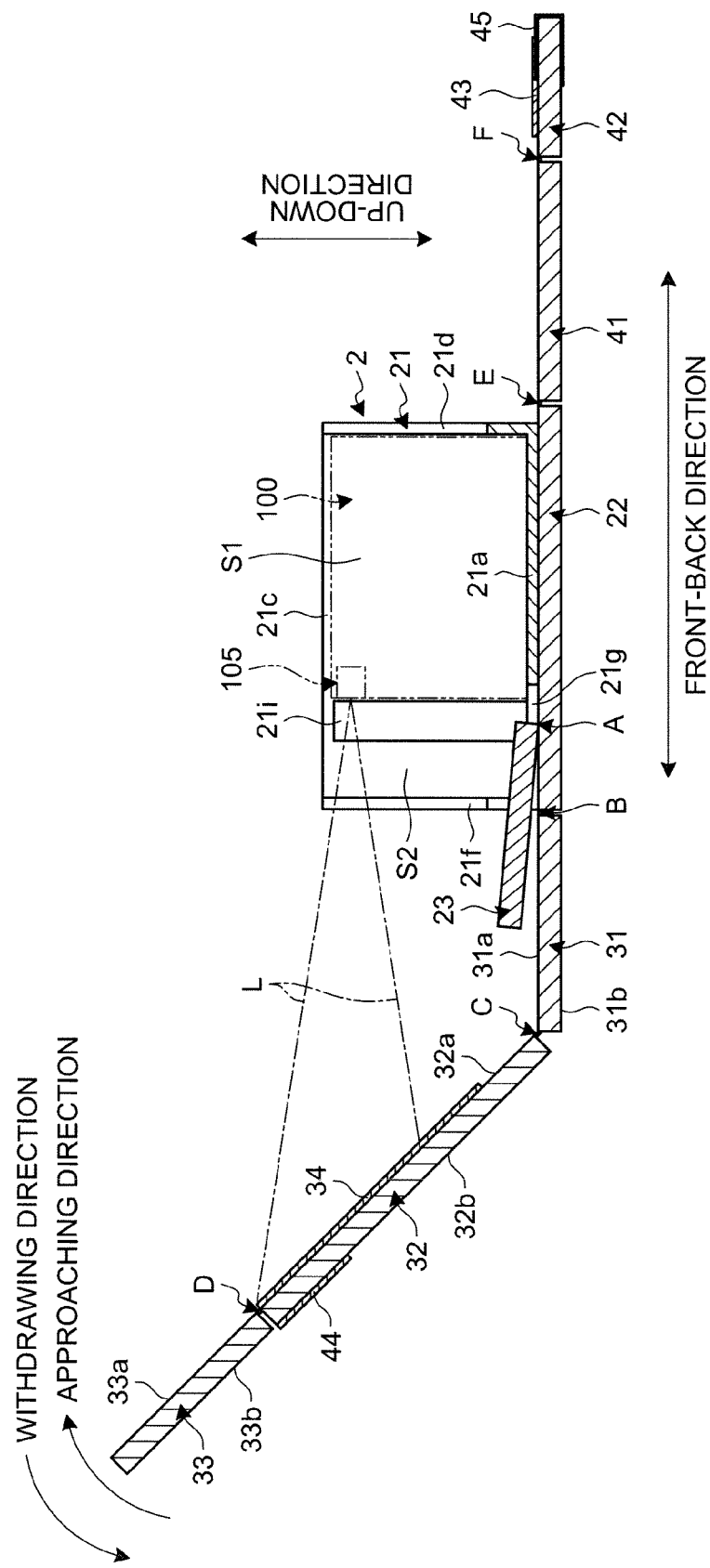
FIG. 7 is a schematic illustrating an example of an overall structure of a carry case according to a modification example 4.

In the first embodiment, the cover 3 may include a screen on which a read image emitted from the image scanner 100 is projected in the housed state. FIG. 7 is a schematic illustrating an example of an overall structure of a carry case according to a modification example 4. In the modification example, as illustrated in FIG. 7, the image scanner 100 includes a projector 105. The projector 105 is connected to a controller (not illustrated) of the image scanner 100. The projector 105 projects, at least, read image data that corresponds to a read medium and is produced by the image scanner 100. The projector 105 is disposed on the back side of the image scanner 100 in the housed state and projects data backward. In the modification example, by rotating the cover 3 in the approaching direction from the position of the developed state, a portion for positioning the image data in the projection direction of the projector 105, that is, a screen 34, on which read image data is displayed, is formed on the back surface 32a of the panel member 32. This structure allows read image data produced by the image scanner 100 to be displayed by the carry case 1-1, without being output to external equipment to be displayed. Consequently, when the image scanner 100 in the housed state operates without receiving electric power from outside, reading a read medium and confirming a read image after reading can easily be performed without connecting the image scanner 100 to external equipment.

Second Embodiment

Figure 8:
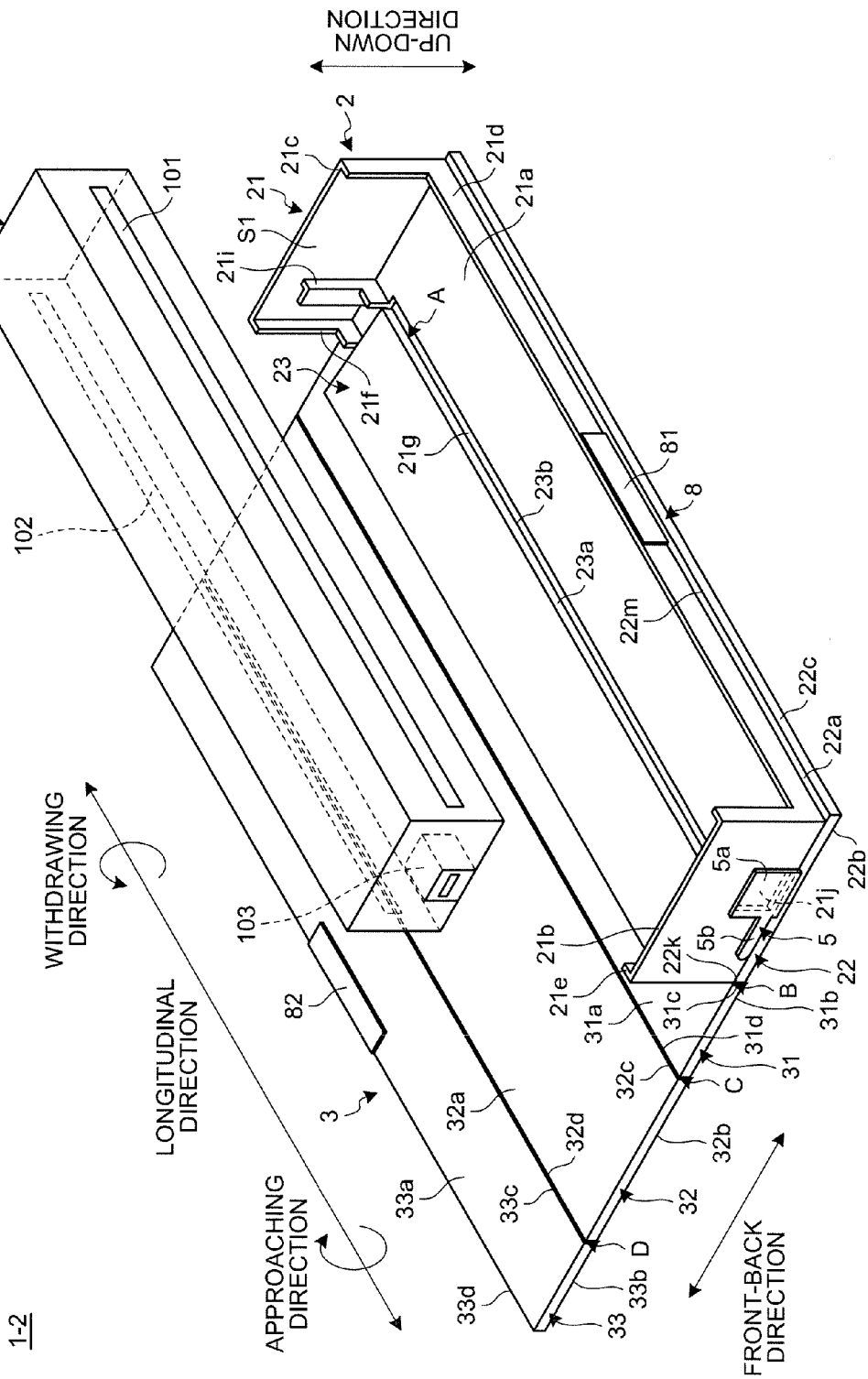
FIG. 8 is an external view of a case for a portable image reading apparatus according to a second embodiment.
Figure 9:
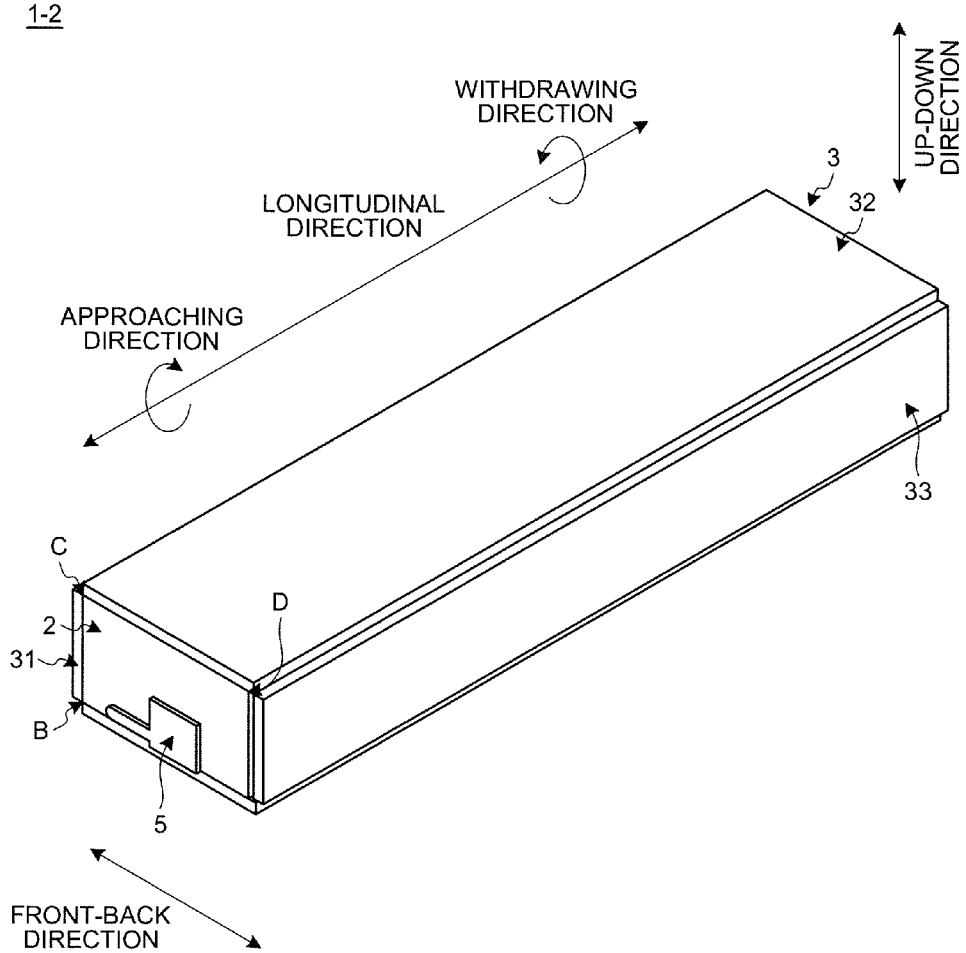
FIG. 9 is a schematic illustrating a state in which a portable image reading apparatus is housed in the case.

A carry case according to a second embodiment is described below. FIG. 8 is an external view of a case for a portable image reading apparatus according to a second embodiment. FIG. 9 is a schematic illustrating a state in which a portable image reading apparatus is housed in the case. A carry case 1-2 according to the second embodiment differs from the carry case 1-1 according to the first embodiment in that the cover 3 is in the closed state and is locked to the body 2 by a lock unit 8. Because the basic structures and operations of the carry case 1-2 according to the second embodiment are nearly the same as those of the carry case 1-1 according to the first embodiment, the same structures and operations are simplified or omitted.

The lock unit 8 is composed of a first lock member 81 and a second lock member 82. The first lock member 81 is disposed on the front side of the body 2, i.e., on the front rib 21d, while the second lock member 82 is disposed on the back surface 33a of the panel member 33 of the cover 3 at a location opposite the first lock member 81 when the cover 3 is in the closed state. In the embodiment, the first lock member 81 and the second lock member 82 form a hook-and-loop fastener. The structure formed by the first lock member 81 and the second lock member 82 is not limited to the hook-and-loop fastener. For example, a combination of a magnet and a magnetic body, or a combination of a hook-shaped member and a member receiving the hook-shaped member may be applicable. When the image scanner 100 is housed in the body 2 and thereafter the cover 3 in the developed state is set to the closed state, the second lock member 82 faces and then comes into contact with the first lock member 81, so that the cover 3 is locked to the body 2 by the lock unit 8. Therefore, the lock unit 8 allows the cover 3 to be in the closed state, so that the cover 3 is locked to the body 2. In this way, the carry case 1-2 according to the second embodiment can house the image scanner 100 in the carry case 1-2 with simple operation in addition to the operations and effects of the first embodiment.

Third Embodiment

Figure 10:
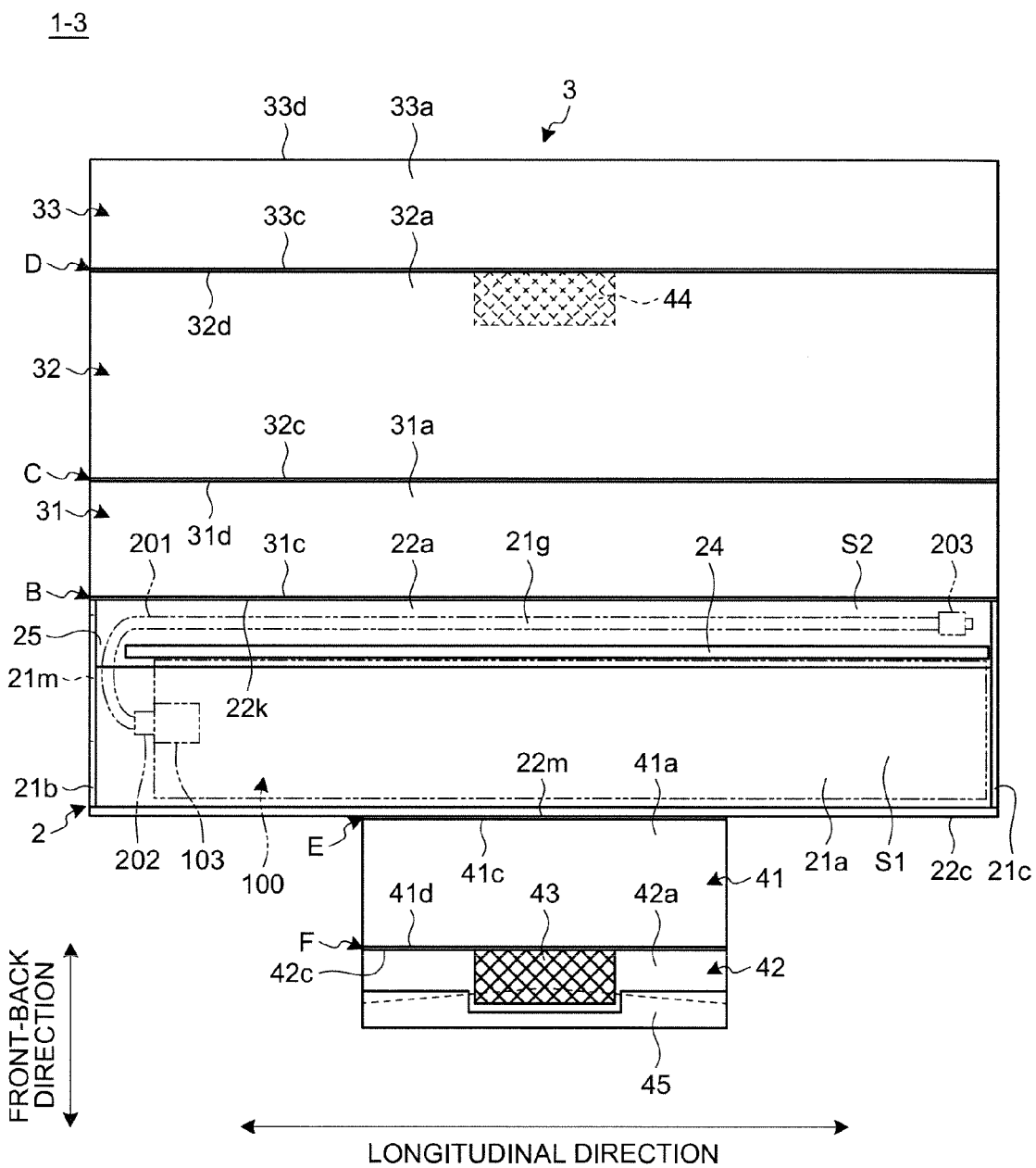
FIG. 10 is a plan view of a case for a portable image reading apparatus according to a third embodiment.

A carry case according to a third embodiment is described below. FIG. 10 is a plan view of a case for a portable image reading apparatus according to the third embodiment. A carry case 1-3 according to the third embodiment differs from the carry case 1-1 according to the first embodiment in that the image scanner 100 connected to a connecting cable 201 can be housed in the carry case 1-3. Because the basic structures and operations of the carry case 1-3 according to the third embodiment are nearly the same as those of the carry case 1-1 according to the first embodiment, the same structures and operations are simplified or omitted.

The housing member 21 includes the side surface members 21b and 21c, and the notch 21g extending to the side surface members 21b and 21c. The bottom surface member 21a is formed such that the distance between the side surface members 21b and 21c in the longitudinal direction, i.e., the length of the first housing unit S1 in the longitudinal direction, is larger than the width of the image scanner 100, i.e., the length of the image scanner 100 in the longitudinal direction. In other words, the first housing unit S1 is formed longer than the image scanner 100 in the housed state in the longitudinal direction. The bottom member 22 is provided with a partition 24. In the embodiment, an opening 25 communicating with the first housing unit S1 and the second housing unit S2 is formed at the edge on the connector 103 side of the image scanner 100 in the housed state out of both edges in the longitudinal direction of the body 2, i.e., between the side surface member 21b and the partition 24. Therefore, even when the partition 24 is in the standing state, the opening 25 can maintain to communicate with the first housing unit S1 and the second housing unit S2. Furthermore, the side surface member 21b has a pullout hole 21m communicating with at least the second housing unit S2.

How the image scanner 100 is housed in the carry case 1-3 according to the third embodiment is described below. First, the image scanner 100 is housed in the body 2. When the peripheral 200 is housed in the body 2 together with the image scanner 100, the partition 24 is set to the standing state, and thereafter the connecting cable 201 is housed in the second housing unit S2. A connecting connector 202 of the connecting cable 201 is beforehand connected to the connector 103 of the image scanner 100 through the opening 25. In this way, the image scanner 100 and the peripheral 200 are housed in the body 2.

Then, while the image scanner 100 and the peripheral 200 are housed in the body 2, the cover 3 is rotated in the approaching direction in which the cover 3 approaches the body 2. Hence, the cover 3 covers the body 2, which is in the closed state. Thereafter, the cover 3, in the closed state, is locked to the body 2 by the lock unit 4. As a result, the image scanner 100 and the peripheral 200 are housed in the carry case 1-3.

A case is described below in which the image scanner 100 is used while housed in the carry case 1-3 according to the third embodiment. First, a user places the carry case 1-3 housing the image scanner 100 and the peripheral 200 at a place where the image scanner 100 and the peripheral 200 are used. Then, the lock held by the lock unit 4 is released. Then, while the lock held by the lock unit 4 is released, the user rotates the cover 3 in the withdrawing direction with respect to the body 2, so that the cover 3 is developed. Then, the user pulls out the connecting cable 201 through the pullout hole 21m, and sets the partition 24 to a slanted state from the standing state. Then, the user connects a connecting connector 203 of the pulled-out connecting cable 201 to external equipment so as to electrically connect the image scanner 100 to the external equipment. Hence, the image scanner 100 in the housed state starts reading a read medium.

According to the carry case 1-3 of the embodiment, in addition to the operations and effects of the first embodiment, every time the image scanner 100 in the housed state is used, the connecting cable 201 does not need to be connected to the image scanner 100 and external equipment. Therefore, the carry case 1-3 can reduce preparatory time necessary for the image scanner 100 in the housed state to be used.

In the embodiment, in the same manner as the modification example 2, a limiting mechanism is preferably provided between the image scanner 100 and the bottom surface member 21a. If the partition 24 is not provided, the connecting cable 201 may be winded, and the pullout hole 21m may be provided on the body 2 at a location opposite the connecting connector 203 of the connecting cable 201 that is winded.

When a tray that can be opened or closed is provided at least one of the insertion port 101 and the outlet 102 of the image scanner 100, a tray cooperative mechanism may be provided that opens the tray in conjunction with rotational operation in the withdrawing direction with respect to a member opposite the tray, e.g., one of the partitions 23 and 24, the cover 3, and the panel members 41 and 42 of the lock unit 4.

The first to the third embodiments and the modification examples 1 to 4 are individually described in the above descriptions. However, part of the structures of the first to third embodiments and the modification examples 1 to 4 may be properly combined with structures of the other embodiments and/or modification examples.

A case for a portable image reading apparatus according to the embodiments of the present invention has the following advantage. The case allows the reading apparatus to read a read medium as an image reading object while the reading apparatus is housed in a body of the case. Accordingly, regardless of conditions of a place where the reading apparatus is used, the case brings about the advantage of providing at least one of an easy use of or a stable use of the reading apparatus Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A case for a portable image reading apparatus, comprising:
    a body for housing the portable image reading apparatus that, while conveying a read medium as an image reading object, reads the image from the read medium;
    a cover supported with respect to the body to be rotatable around a longitudinal direction of the body; and
    a lock unit for locking the cover with respect to the body in a closing state in which the cover covers the body when the cover is rotated with respect to the body in an approaching direction in which the cover approaches the body, wherein
    when the cover is rotated with respect to the body in a withdrawing direction opposite to the approaching direction, with the lock by the lock unit released, the cover is developed to form a discharge path of the read medium,
    the body includes a partition that is supported such that the partition is rotatable around the longitudinal direction, and
    the partition partitions the body into a first housing unit holding the portable image reading apparatus and a second housing unit.

2. The case according to claim 1, further comprising a partition rotation mechanism that applies a force rotating the partition in the withdrawing direction.

3. The case according to claim 1, wherein the body is provided with a connecting hole at a location facing a connector that is formed on the portable image reading apparatus housed in the body and electrically connects the portable image reading apparatus to external equipment.

4. The case according to claim 3, further comprising a cap that is insertable in and removable from the connecting hole.

5. The case according to claim 1, further comprising:
an opening formed between the partition and an edge out of both edges in the longitudinal direction of the body, the edge being located on a side adjacent to the connector of the portable image reading apparatus housed in the body, the connector providing electrical connection with external equipment, the opening communicating with the first housing unit and the second housing unit,
wherein the first housing unit is formed longer than the portable image reading apparatus housed in the body in the longitudinal direction.

6. The case according to claim 5, wherein the body is provided with a pullout hole on the edge located on the side adjacent to the connector, for communicating with at least the second housing unit.

7. The case according to claim 1, further comprising a cover rotation mechanism that applies a force rotating the cover in the withdrawing direction.

8. The case according to claim 1, further comprising a limiting mechanism that limits movement of the portable image reading apparatus housed in the body relative to the body.

9. The case according to claim 1, further comprising a battery that is housed in the body and supplies electric power to the portable image reading apparatus housed in the body.

10. The case according to claim 1, wherein the cover includes a screen at a location covered in a projection direction of a projector that is included in the portable image reading apparatus housed in the body, the projector projecting at least read image data produced by the portable image reading apparatus and corresponding to a read medium, the screen displaying the read image data.

11. The case according to claim 1, wherein the second housing unit houses peripherals of the image reading apparatus.

12. The case according to claim 11, wherein the peripherals include connecting cables.

* * * * *